UNITED STATES PATENT OFFICE.

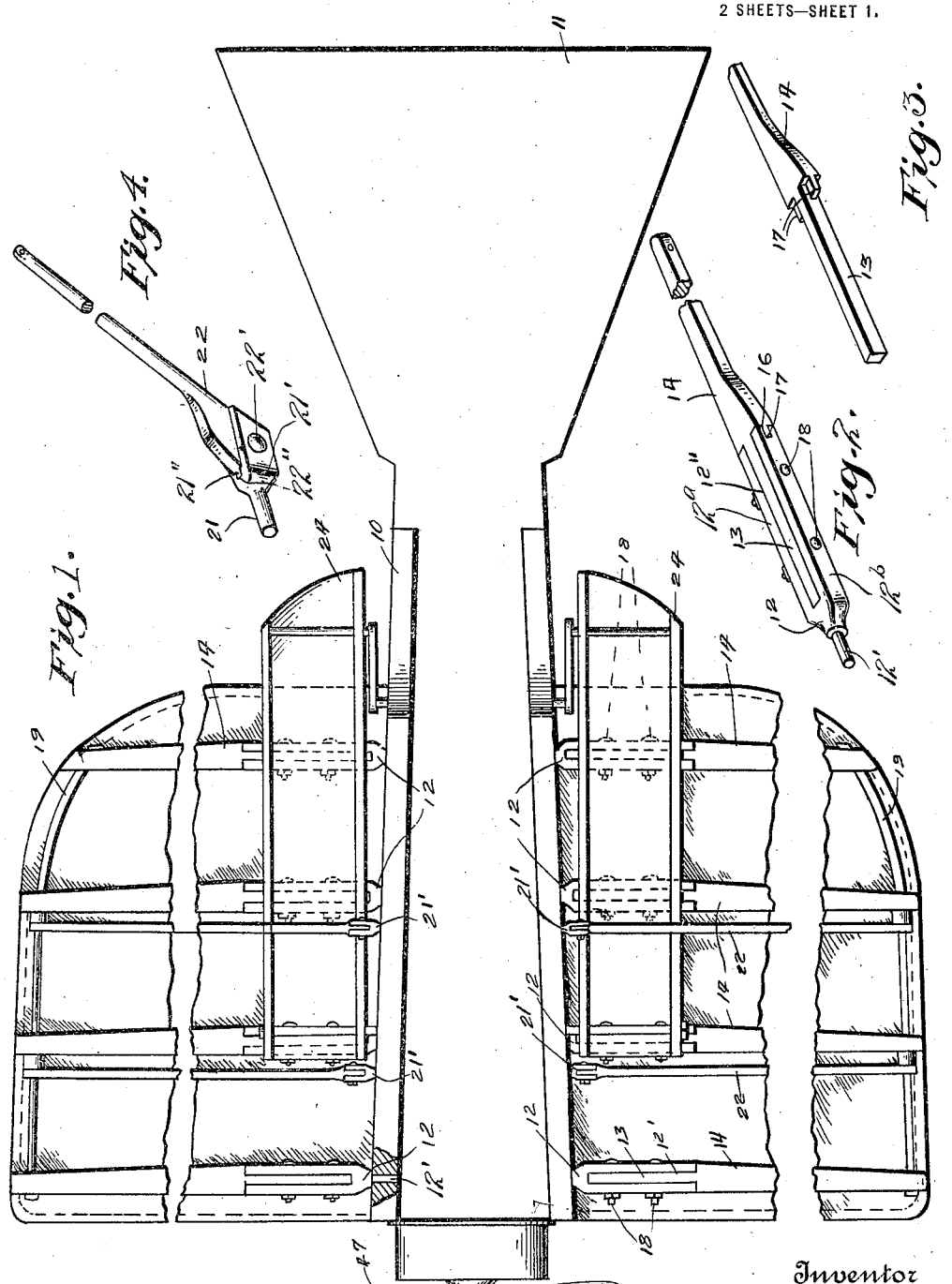

JESSIE D. DENSON, OF GRAND RAPIDS, MICHIGAN.

AEROPLANE.

1,341,886. Specification of Letters Patent. Patented June 1, 1920.

Original application filed November 5, 1918, Serial No. 261,260. Divided and this application filed September 2, 1919. Serial No. 321,200½.

*To all whom it may concern:*

Be it known that I, JESSIE D. DENSON, a citizen of the United States, residing at Grand Rapids, in the county of Kent, State of Michigan, have invented certain new and useful Improvements in Aeroplanes; and I do hereby declare the following to be a full, clear, and exact description of the invention, such as will enable others skilled in the art to which it appertains to make and use the same.

This invention relates to aeroplanes and has for its object to improve the manner of connecting the ribs to the fuselage as well as to the particular construction of the rib that facilitates assembling and disassembling of the structure. Other objects of the invention, including the improvement of the sustaining plane braces, will be understood from the following description.

The present application is a division of my original application for patent on aeroplane, filed Nov. 5th, 1918, Serial Number 261,260.

In the drawings:

Figure 1 is a bottom plan view of an aeroplane embodying the present invention.

Fig. 2 is a perspective view, partly broken away, showing one of the jointed sustaining ribs.

Fig. 3 is a perspective view showing the inner end portion of the outer section of a rib.

Fig. 4 is a perspective view, partly broken away, showing a brace arm of a sustaining plane.

Figure 5:
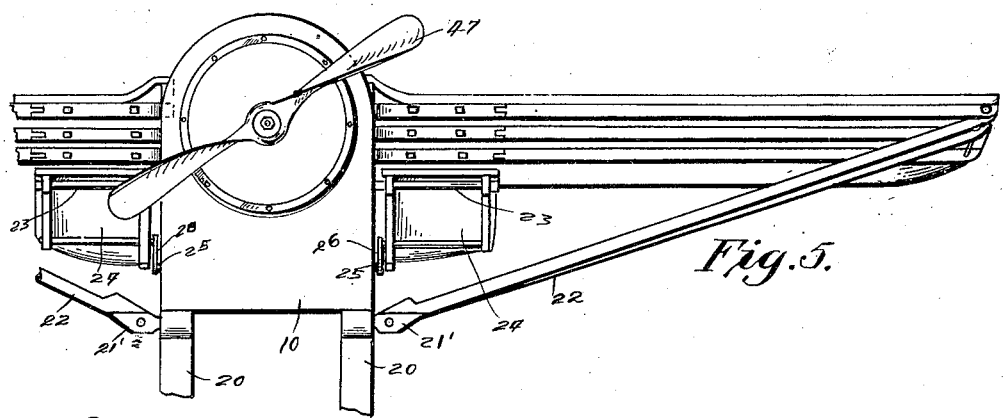
Figs. 5 and 6 are front and side elevations respectively of an aeroplane, partly broken away.
Figure 6:
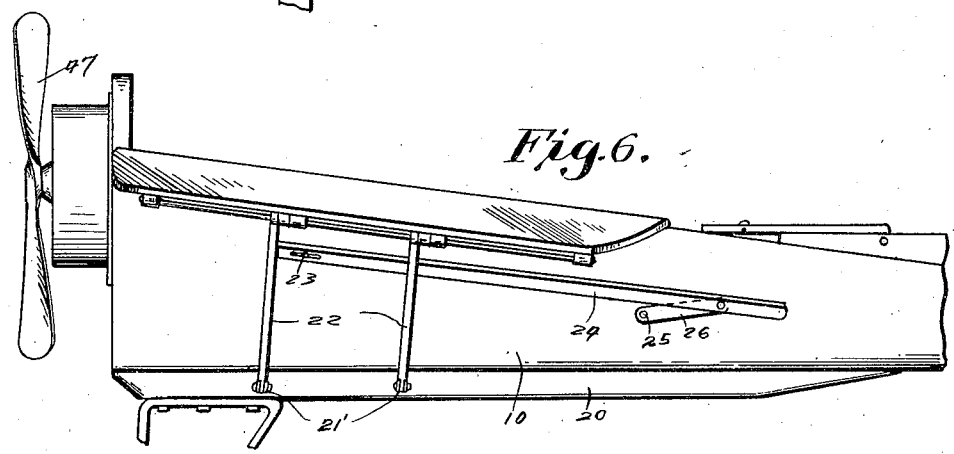

Referring particularly to the accompanying drawings 10 represents the body or fuselage of an aeroplane having secured to the forward portions of its sides the outstanding rib sections 12, the inner end portions of which constitute pins 12' that are engaged in corresponding sockets in the fuselage. Each rib section 12 is bifurcated at its outer end, as shown at 12", with resultant laterally spaced arms 12ª and 12ᵇ and the outer ends of these arms are provided with alining transverse kerfs 16, respectively that receive the corresponding lugs 17 at opposite sides of the tongue 13 that extends front the enlarged base of the outer rib section 14, when the tongue 13 is disposed between the arms 12ª and 12ᵇ. To hold the tongue 13 removably between the arms, bolts 18 are engaged transversely through them.

Disposed through the outer ends of all of the outer sections of the ribs, are the rods 19 that serve to sustain the ribs in their proper mutually spaced relations.

Runners or skids 20 are secured to the bottom of the fuselage and in these runners are engaged the stems 21 of the brackets 21', which are bifurcated to receive the inner ends of brace arms 22, the outer ends of which are connected to the rod 19. The brace arms are connected with the brackets 21' removably, by means of bolts 22', the braces at their inner ends having tongues 21" that engage in sockets 22" in the brackets when the braces are at the proper angles to the brackets, thus to produce a rigid structure.

It will be understood that with this construction, the ribs may be quickly disconnected from the fuselage, as may also the braces, to facilitate close packing of the parts for storage or other purpose.

What is claimed is:

An aeroplane including a fuselage, laterally extending rib members having terminal pins engaged with the fuselage, the outer end portions of said members being bifurcated and terminally kerfed, outer rib members having longitudinal tongues engaged removably in the bifurcations of the inner members and having lugs at the sides of the tongues removably engaged in said kerfs, means for holding the rib members removably assembled, and sustaining planes with which the ribs are incorporated.

In testimony whereof I have affixed my signature, in the presence of two witnesses.

JESSIE D. DENSON.

Witnesses:
 EDWARD L. WAGNER,
 DAVID WALDRON.